US010661992B2

(12) United States Patent
Wicks et al.

(10) Patent No.: US 10,661,992 B2
(45) Date of Patent: *May 26, 2020

(54) ROBOTIC PUT WALL

(71) Applicant: Intelligrated Headquarters, LLC, Mason, OH (US)

(72) Inventors: Matthew R. Wicks, St. Charles, MO (US); David E. Franklin, Loveland, OH (US); Thomas Michael Ferner, Lake Saint Louis, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,771

(22) Filed: Jul. 8, 2019

(65) Prior Publication Data

US 2019/0329979 A1 Oct. 31, 2019

Related U.S. Application Data

(63) Continuation of application No. 15/480,436, filed on Apr. 6, 2017, now Pat. No. 10,384,872.

(Continued)

(51) Int. Cl.
*B65G 1/137* (2006.01)
*G06Q 10/08* (2012.01)

(52) U.S. Cl.
CPC ......... *B65G 1/1373* (2013.01); *B65G 1/1376* (2013.01); *G06Q 10/087* (2013.01)

(58) Field of Classification Search
CPC ............................ B65G 1/1376; G06Q 10/087
See application file for complete search history.

(56) References Cited

U.S. PATENT DOCUMENTS 6,011,998 A * 1/2000 Lichti ................. B65G 1/1376
   414/268
6,176,392 B1 1/2001 William et al.
(Continued)

FOREIGN PATENT DOCUMENTS

EP       2102079 A1    9/2009
JP       03-056304 A   3/1991
(Continued)

OTHER PUBLICATIONS

International Search Report and Written Opinion for related International Application No. PCT/US2017/049045 dated Jan. 25, 2018.
(Continued)

*Primary Examiner* — Patrick H Mackey
(74) *Attorney, Agent, or Firm* — Alston & Bird LLP

(57) ABSTRACT

A material handling system automatically each picking orders using a put wall. A controller determines whether any of more than one removable intermediate holders in a put wall that are within the reach of a first robotic arm contain one or more articles that are ready for transporting away from the put wall. The controller directs the first robotic arm to: (i) engage the selected removable intermediate holder, (ii) move the selected removable intermediate holder to an empty order container, and (iii) reorient the selected removable intermediate holder to transfer the one or more articles from the selected removable intermediate holder to the empty order container. In one or more embodiments, the articles can be placed in the put wall by conveying donor totes to an each picking robotic arm that places picked articles into an end effector of a second robotic arm.

19 Claims, 17 Drawing Sheets

Related U.S. Application Data

(60) Provisional application No. 62/381,065, filed on Aug. 30, 2016.

(56) References Cited

U.S. PATENT DOCUMENTS

| | | | | |
|---|---|---|---|---|
| 9,315,323 B2* | 4/2016 | Schubilske | ............ | G05B 15/02 |
| 9,481,518 B2* | 11/2016 | Neiser | .................. | B65G 1/1378 |
| 9,600,798 B2* | 3/2017 | Battles | ................. | B65G 1/1373 |
| 9,688,472 B1* | 6/2017 | Stubbs | ................... | B25J 9/0096 |
| 9,751,693 B1* | 9/2017 | Battles | ................. | G06Q 10/087 |
| 9,834,380 B2* | 12/2017 | Hamilton | ........... | G06Q 10/0875 |
| 9,950,863 B2* | 4/2018 | O'Brien | ............... | B65G 1/1373 |
| 10,007,827 B2* | 6/2018 | Wagner | ................ | G06K 7/1404 |
| 10,384,872 B2* | 8/2019 | Wicks | ................. | B65G 1/1376 |
| 2014/0244026 A1 | 8/2014 | Neiser | | |
| 2018/0282065 A1* | 10/2018 | Wagner | ................ | B65G 1/1371 |

FOREIGN PATENT DOCUMENTS

| | | |
|---|---|---|
| WO | 20071009136 A1 | 1/2007 |
| WO | 2008/067964 A1 | 6/2008 |

OTHER PUBLICATIONS

Notice of Allowance for U.S. Appl. No. 15/480,436, dated Apr. 9, 2019.

Office Action for U.S. Appl. No. 15/480,436, dated Feb. 8, 2019.

* cited by examiner

ROBOTIC PUT WALL

CROSS-REFERENCE TO RELATED APPLICATIONS

This application is a continuation of U.S. application Ser. No. 15/480,436, filed on Apr. 6, 2017, which claims the benefit of priority under 35 U.S.C. § 119(e) to U.S. Provisional Application Ser. No. 62/381,065 entitled "Robotic Put Wall," filed Aug. 30 2016, the contents of which are incorporated herein by reference in their entirety.

BACKGROUND

1. Technical Field

The present disclosure generally relates controlling material handling systems for order fulfillment, and more specifically to utilizing put walls for assembling orders of particular articles.

2. Description of the Related Art

Order processing is the process or work-flow associated with the picking, packing and delivery of the packed items to a shipping carrier. Order processing is a key element of order fulfillment. Order processing operations or facilities are commonly called "distribution centers". Order processing is a sequential process involving: (i) Picking: consists in taking and collecting articles in a specified quantity before shipment to satisfy customers' orders; (ii) Sorting: process that separates items according to destination; (iii) Preconsolidation or package formation: includes weighting, labeling and packing; and (iv) Consolidation: gathering packages into loading units for transportation, control and bill of lading. Piece picking, also known as broken case picking or pick/pack operations, describes systems where individual items are picked. Operations using piece picking typically have a large stock keeping unit (SKU) base in the thousands or tens of thousands of items, small quantities per pick, and short cycle times. Examples of piece pick operations include e-commerce retail companies.

Order fulfillment such as for e-commerce or store replenishment for less than a full container of products is often accomplished by having an operator directed to pick a product from a donor container and put the product into an order container. Reading a display or piece of paper with the order is an inefficient approach when the permutations of possible donor containers and order containers increases. To provide for better efficiency and accuracy, many distribution centers and warehouses rely upon a pick-to-light (PTL) system or a pick-to-voice system in order to direct an operator to where the pick or put is to occur. While such systems can increase the efficiency of the human operator, the tasks performed are exceedingly repetitious and prone to human error even if pick/put validation steps are imposed.

BRIEF SUMMARY

In one aspect, the present disclosure provides a material handling system for automatically each picking orders in a material handling system. In one or more embodiments, The material handling system includes a put wall having more than one storage location each accessible from a front side and a back side. The material handling system includes more than one removable intermediate holder that respectively are received in the more than one storage location. The material handling system includes at least one conveyor system that brings donor containers and takes away order containers. The material handling system includes a first robotic arm positioned on the back side of the put wall and having a reach that services at least a portion of the put wall, the first robotic arm comprising an end effector to engage a selected open of the more than one removable intermediate holder. The material handling system includes a controller in communication with a source of inventory data of the put wall and in communication with the first robotic arm. The controller determines whether any of the more than one removable intermediate holders within the reach of the first robotic arm contain one or more articles that are ready for transporting away from the put wall. In response to determining that a selected removable intermediate holders of the more than one removable intermediate holders are ready for transporting, directing the first robotic arm to: (i) engage the selected removable intermediate holder, (ii) move the selected removable intermediate holder to an empty order container, and (iii) reorient the selected removable intermediate holder to transfer the one or more articles from the selected removable intermediate holder to the empty order container.

In another aspect, the present disclosure provides a material handling system for automatically each picking orders in a material handling system. In one or more embodiments, the material handling system includes a put wall having more than one storage location each accessible from a front side and comprising more than one dispensing mechanism to selectively move any articles from a particular storage location of the more than one storage location out to the front side, wherein the more than one dispensing mechanism are one of: (i) actively dispensed and (ii) passively dispensed. The material handling system includes at least one conveyor system that brings donor containers and takes away order containers. The material handling system includes a first robotic arm positioned on the front side of the put wall and having a reach that services at least a portion of the put wall, the first robotic arm comprising an end effector that is shaped to receive and to cradle articles. The material handling system includes a controller in communication with a source of inventory data of the put wall and in communication with the first robotic arm. The controller determines whether any of the more than storage location within the reach of the first robotic arm contain one or more articles that are ready for transporting away from the put wall. The controller, in response to determining that a selected storage location contains articles that are ready for transporting, directs the first robotic arm to: (i) position the end effector proximate and below the selected storage location to receive the one or more articles from the selected storage location; (ii) move the end effector to an empty order container, and (iii) reorient the end effector to transfer the one or more articles from the end effector to the empty order container.

In an additional aspect of the present disclosure, a method is provided of assembling an order of different types of articles utilizing a two-sided put wall in a material handling system. In one or more embodiments, the method includes conveying, on at least one conveyor system, a selected donor container to an each picking robotic arm that is proximate to a put wall having more than one storage location each accessible from a front side and a back side with more than one removable intermediate holder respectively received in the more than one storage location. The method includes positioning an end effector of a put away robotic arm within reach of the each picking robotic arm. The method includes picking at least one article from the selected donor container into the end effector of the put away robotic arm. The method includes moving the end effector of the put away robotic arm to deposit the at least one article in an assigned removable intermediate holder of the more than one removable intermediate holders. The method includes determining whether any particular removable intermediate holder contains one or more articles that constitute a completed order. In response to determining that a particular removable intermediate holder contains a completed order, the method includes removing the particular removable intermediate holder from the back side of the put wall using a take away robotic arm. The method includes moving the particular removable intermediate holder to an empty order container. The method includes reorienting the particular removable intermediate holder to transfer the one or more articles from the selected removable intermediate holder to the empty order container. The method includes conveying the order container with the completed order.

In a further aspect of the present disclosure, a method is provided of assembling an order of different types of articles utilizing a one-sided put wall in a material handling system. In one or more embodiments, the method includes conveying, on at least one conveyor system, a selected donor container to an each picking robotic arm that is proximate to a put wall having more than one storage location each accessible from a front side. The method includes positioning an end effector of a put away robotic arm within reach of the each picking robotic arm. The method includes picking at least one article from the selected donor container into the end effector of the put away robotic arm. The method includes moving the end effector of the put away robotic arm to deposit the at least one article in an assigned storage location. The method includes determining whether any particular storage location contains one or more articles that constitute a completed order. The method includes in response to determining that a particular storage location contains a completed order, positioning the end effector on the put away robotic arm adjacent to the particular storage location. The method includes dispensing the completed order into the end effector. The method includes moving the end effector on the put away robotic arm to an empty order container. The method includes reorienting the particular removable intermediate holder to transfer the one or more articles from the end effector to the empty order container. The method includes conveying the order container with the completed order.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill, in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
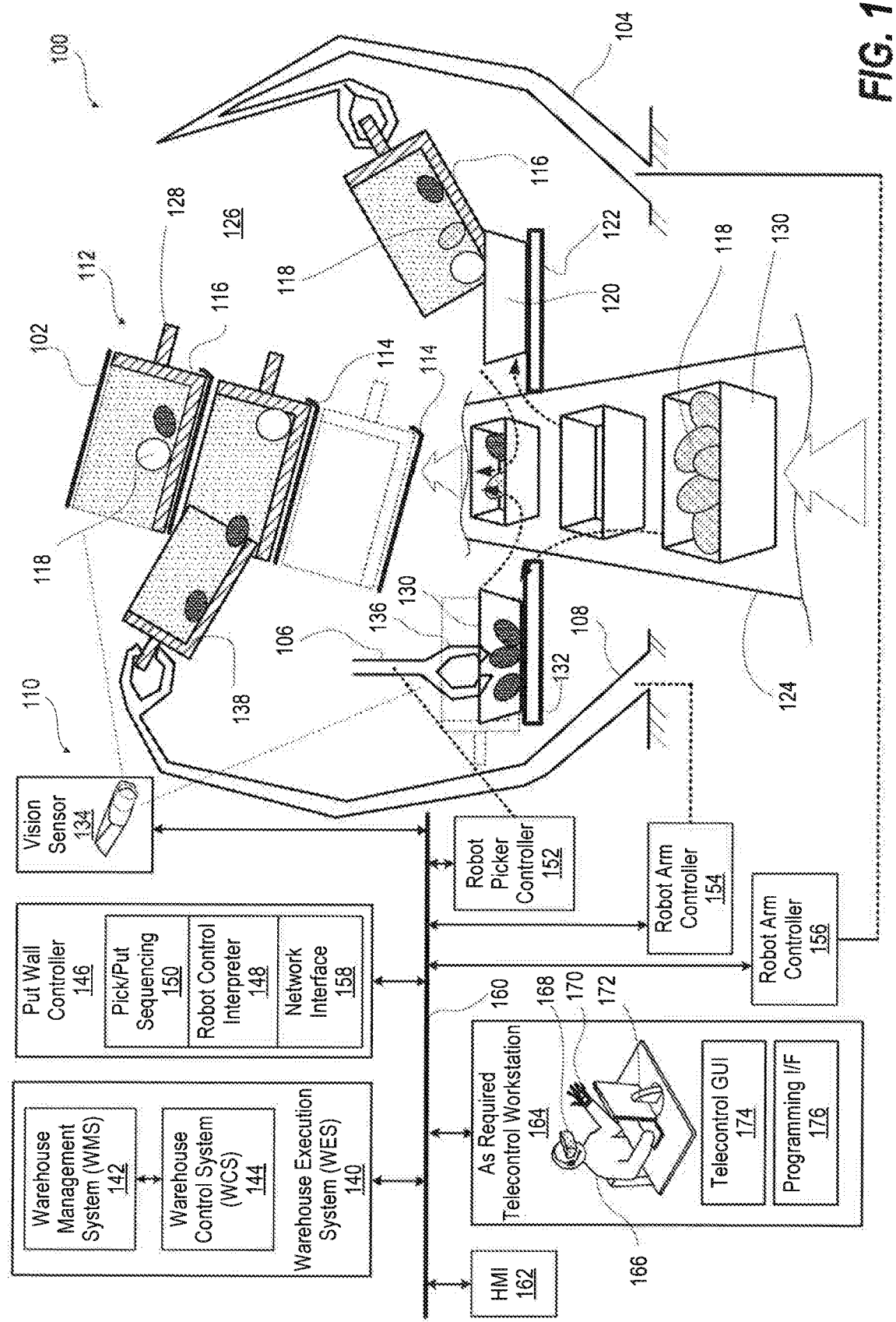
FIG. 1 illustrates a diagram of a first example material handling system including a two-sided put wall serviced on both sides by robotic arms and including a functional block diagram of a control system, according to one or more embodiments.

A material handling system automatically each picking orders using a put wall. A controller determines whether any of more than one removable intermediate holders in a put wall that are within the reach of a first robotic arm contain one or more articles that are ready for transporting away from the put wall. The controller directs the first robotic arm to: (i) engage the selected removable intermediate holder, (ii) move the selected removable intermediate holder to an empty order container, and (iii) reorient the selected removable intermediate holder to transfer the one or more articles from the selected removable intermediate holder to the empty order container. In one or more embodiments, the articles can be placed in the put wall by conveying donor totes to an each picking robotic arm that places picked articles into an end effector of a second robotic arm.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a first example material handling system 100 including a two-sided put wall 102 serviced on both sides by robotic arms 104, 106, 108 controlled by a control system 110, according to one or more embodiments. The first robotic arm 104, which is on a back side 112 of the two-sided put wall 102 that is tipped back, removes from storage locations 114 removable intermediate holders 116 and empties articles 118 therein into an order container 120. In one embodiment, the order container is positioned on back side work area 122 and then pushed by the first robotic arm 104 or transferred onto a conveyor 124 for take away from a put wall cell 126. The removable intermediate holder 116 can have a rectoid shape with an open top and front and with an engagement feature on the back such as a cylindrical, horizontal handle 128.

The conveyor 124 can bring donor containers 130 containing articles 118 to be picked and placed into an assigned removable intermediate holder 116. In one or more embodiments, a selected donor container 130 is transferred or pulled onto a front side workstation 132. For clarity, only a single conveyor 124 is depicted for delivering to and taking away articles 118 from the robotic put wall cell 126; however, more than one conveyor can be used for either or both functions. Donor and order containers 130, 120 can be the same type of container or different. Containers can be cartons, totes, trays, etc. For clarity, donor containers 130 can contain identical articles 118, although in one or more embodiments the donor container can be partitioned into separate SKU compartments or the control system 110 can otherwise differentiate different types of articles 118 for selective picking, such as via vision sensor 134. A second robotic arm 106 that has an each picking end effector 136 places an assigned number of articles 118 into a smaller end effector 138 of a third robotic arm 108 that performs put away. In one embodiment, the smaller end effector 138 is mounted to the third robotic arm 108. The smaller end effector 138 can be inserted into an open front portion of the selected removable intermediate holder 116 and reoriented to slide the articles 118 that are received and cradled by the smaller end effector 138 to gently slide into the assigned removable intermediate holder 116.

The control system 110 can include warehouse execution system (WES) 140 having a warehouse management system (WMS) 142 responsible for inventory tracking and order fulfillment. A warehouse control system (WCS) 144 of WES 140 controls material handling devices such as the conveyor 124. As part of the WCS 144, a put wall controller 146 can coordinate the interactions between robotic arms 104, 106, 108 and conveyor 124 as well as other active components. The put wall controller 146 can contain protocol interfaces such as a robot control interpreter 148 that executes actions dictated by a pick/put sequencing application 150 by making each command for a particular robotic arm 104, 106, 108 understandable by a respective robotic arm controller 152, 154, 156, which can utilize different proprietary arm software. The put wall controller 146 can include a network interface 158 to talk to other functional components on a system interconnect 160. For example, the put wall controller 146 can interact with user via a human-machine interface (HMI) device 162, such as wireless tablet or smartphone. In addition, an as required telecontrol workstation 164 can allow a user 166 via virtual reality goggles 168, instrumented glove 170, and workstation computer 172 to monitor or take control of a particular portion of the robotic put wall cell 126. For example, one of the robotic arms 104, 106, 108 can experience difficulty picking or placing a particular article 118 and alert the as required telecontrol workstation 164 to take over using a telecontrol graphical user interface (GUI) 174. The telecontrol workstation 164 can also execute a programming interface (I/F) 176.

Figure 2:
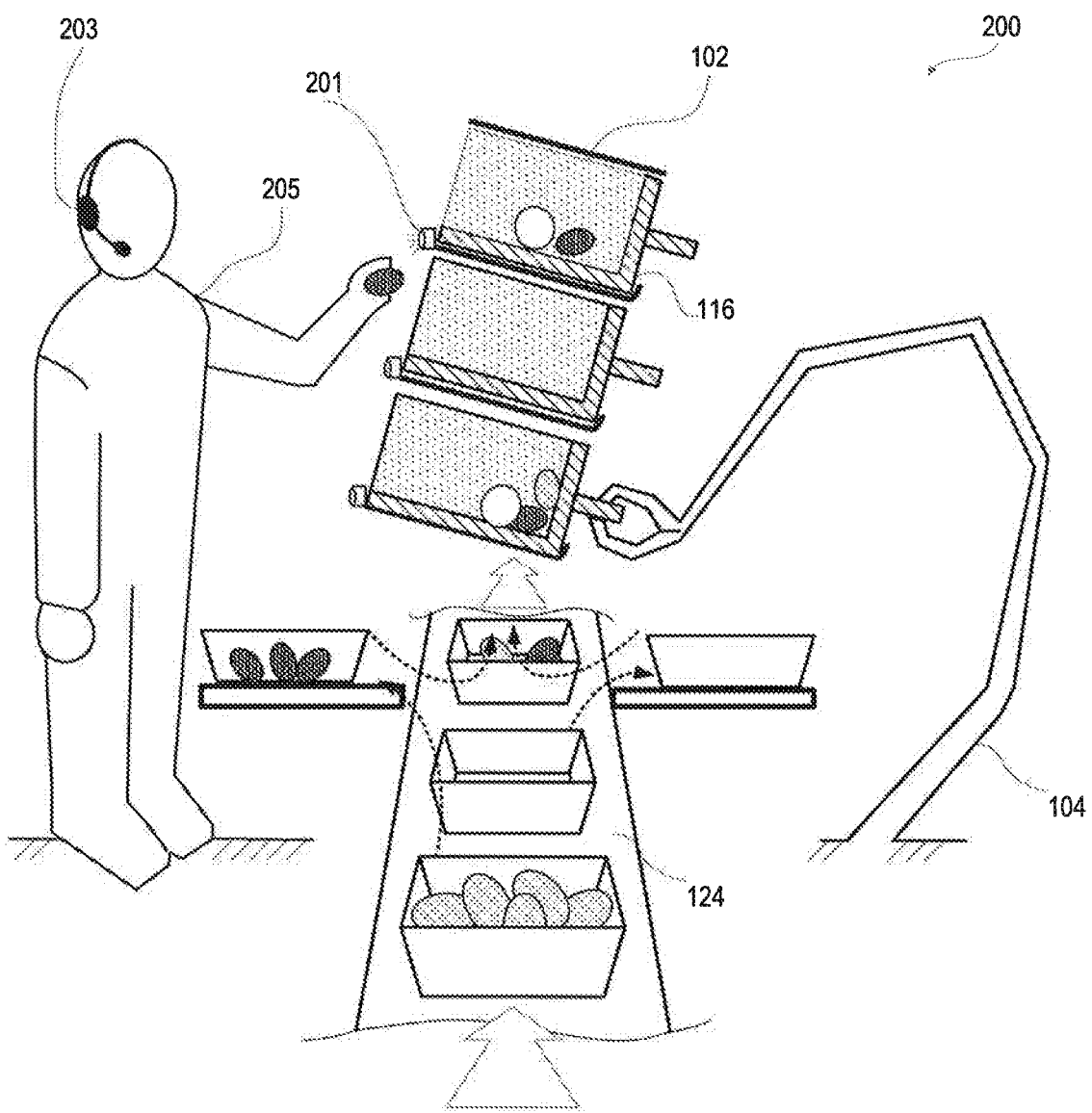
FIG. 2 illustrates a diagram of a second example material handling system including a two-sided put wall with one side serviced by a robotic arm, according to one or more embodiments.

FIG. 2 illustrates a second example material handling system 200 including the two-sided put wall 102 with the back side serviced by the robotic arm 104, according to one or more embodiments. Pick-to-Light (PTL) device 201 or voice system 203 allow a user 205 to augment the system, such as during a staged implementation or as part of a surge capability along compliant robotic arms (not shown).

Figure 3:
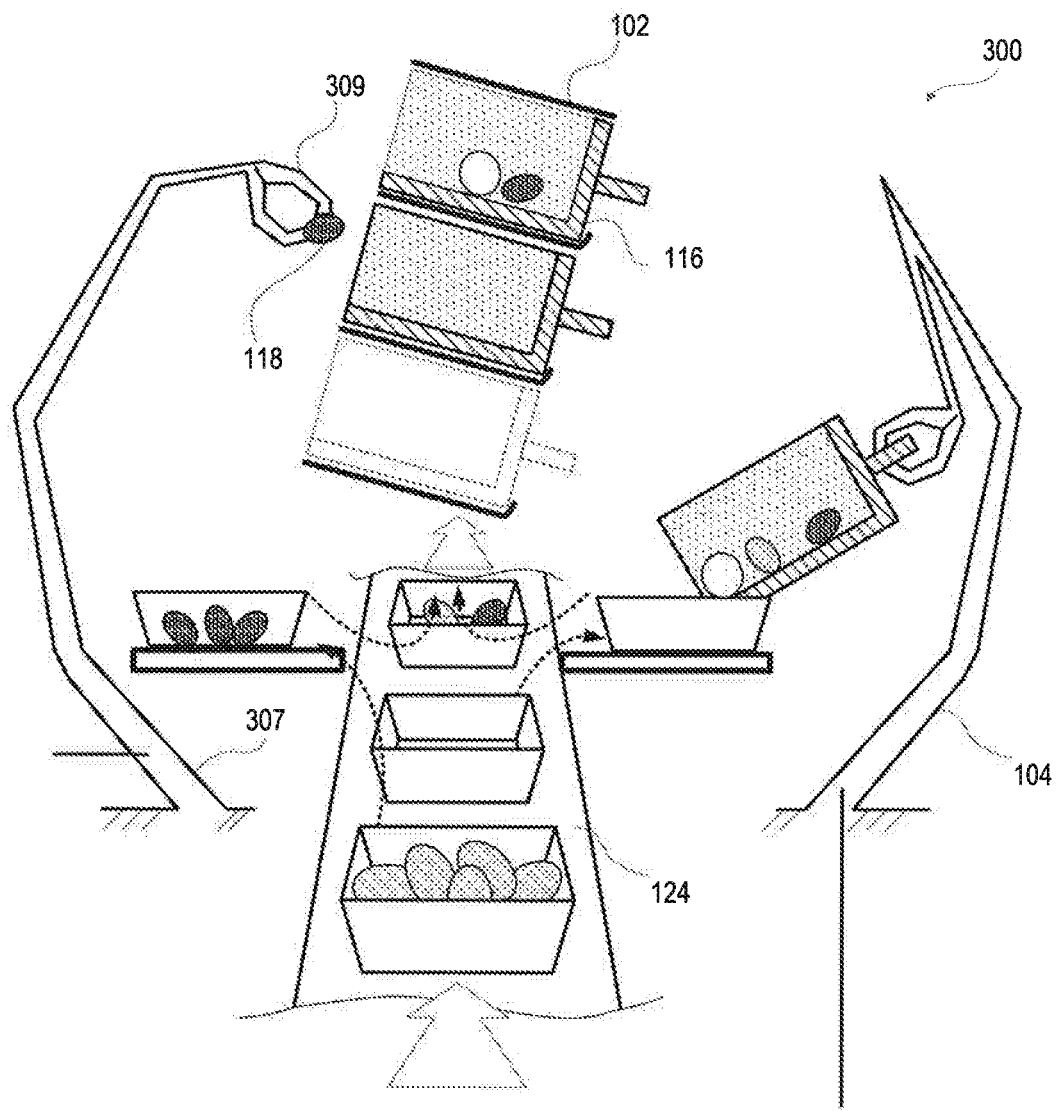
FIG. 3 illustrates a diagram of a third example material handling system including a two-sided put wall serviced on both sides by robotic arms, according to one or more embodiments.

FIG. 3 illustrates a third example material handling system 300 including the two-sided put wall 102 with the back side serviced by the robotic arm 104, according to one or more embodiments. A front side robotic arm 307 has an each picking end effector 309 that can both pick and put away articles 118.

Figure 4:
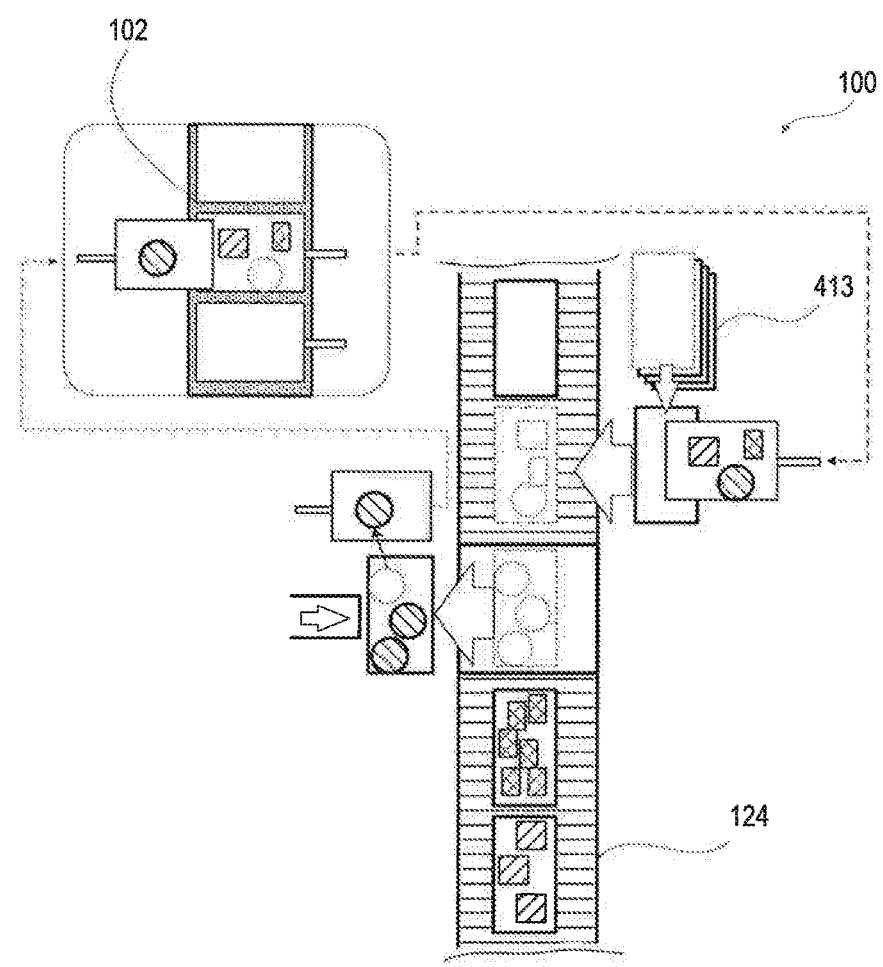
FIG. 4 illustrates a top-view diagram of the first example material handling system of FIG. 1, according to one or more embodiments.

FIG. 4 illustrates a the first example material handling system 100 that further includes an empty order tote dispenser 413, according to one or more embodiments.

Figure 5:
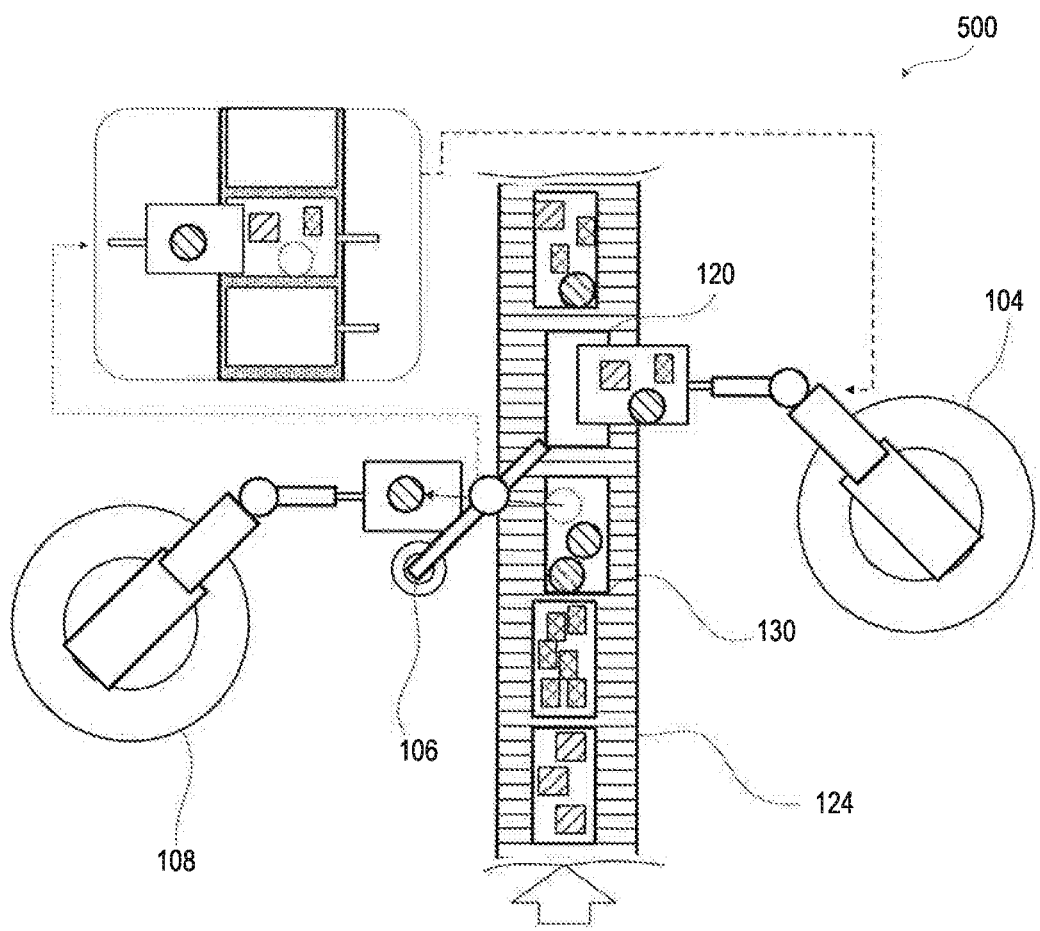
FIG. 5 illustrates a top-view diagram of a fourth example material handling system, according to one or more embodiments.

FIG. 5 illustrates a fourth example material handling system 500 wherein the robotic arms 104, 106, 108 are positioned such picking from donor containers 130 and dispensing into order containers 120 can occur directly on the conveyor 124.

Figure 6:
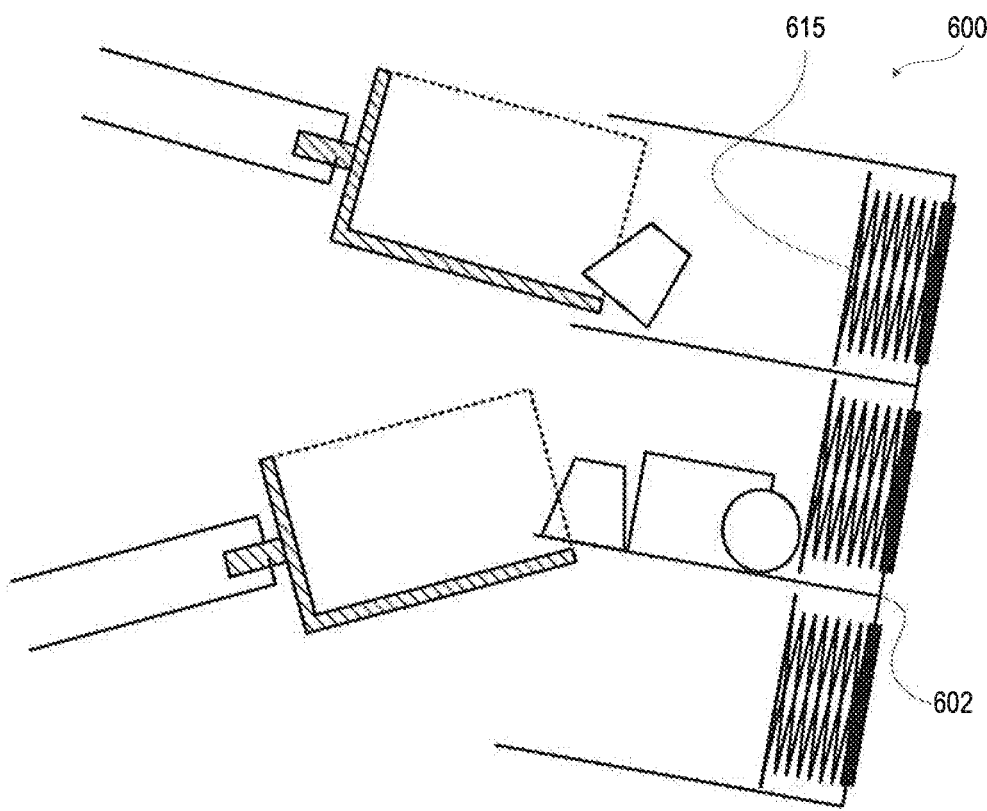
FIG. 6 illustrates a side view diagram of another example material handling system using a one-sided put wall of with first example active dispensing mechanisms in a retracted position, according to one or more embodiments.
Figure 7:
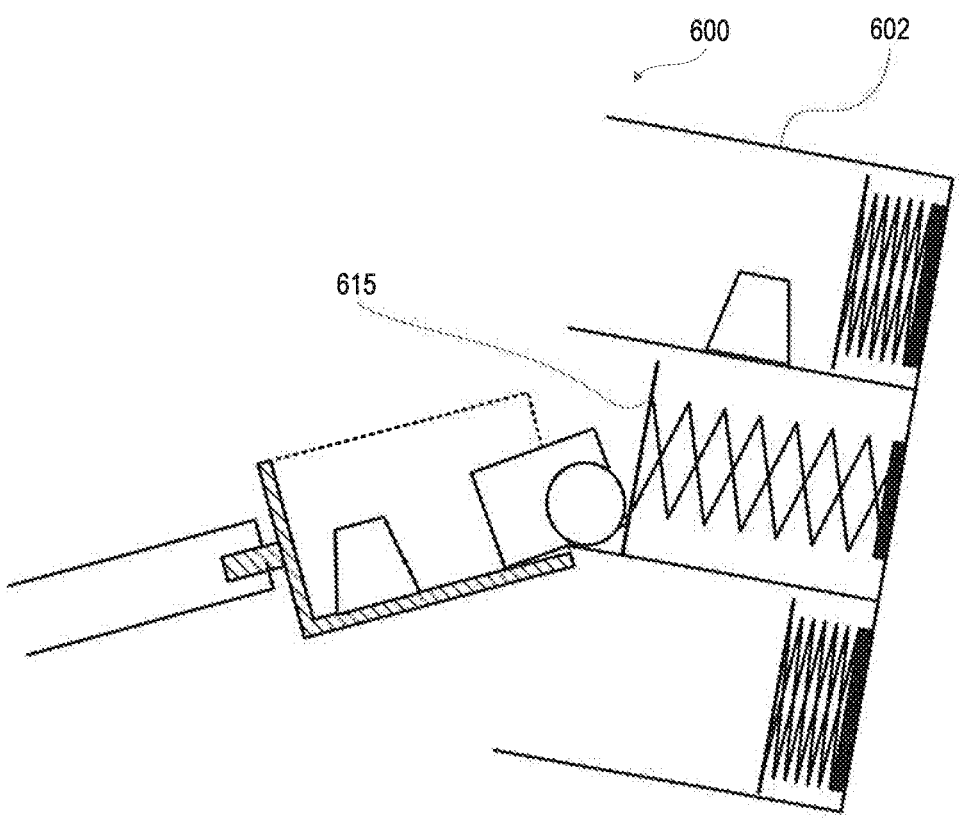
FIG. 7 illustrates a side view diagram of the one-sided put wall of FIG. 6 with one first example active dispensing mechanisms in a dispensing position, according to one or more embodiments.
Figure 8:
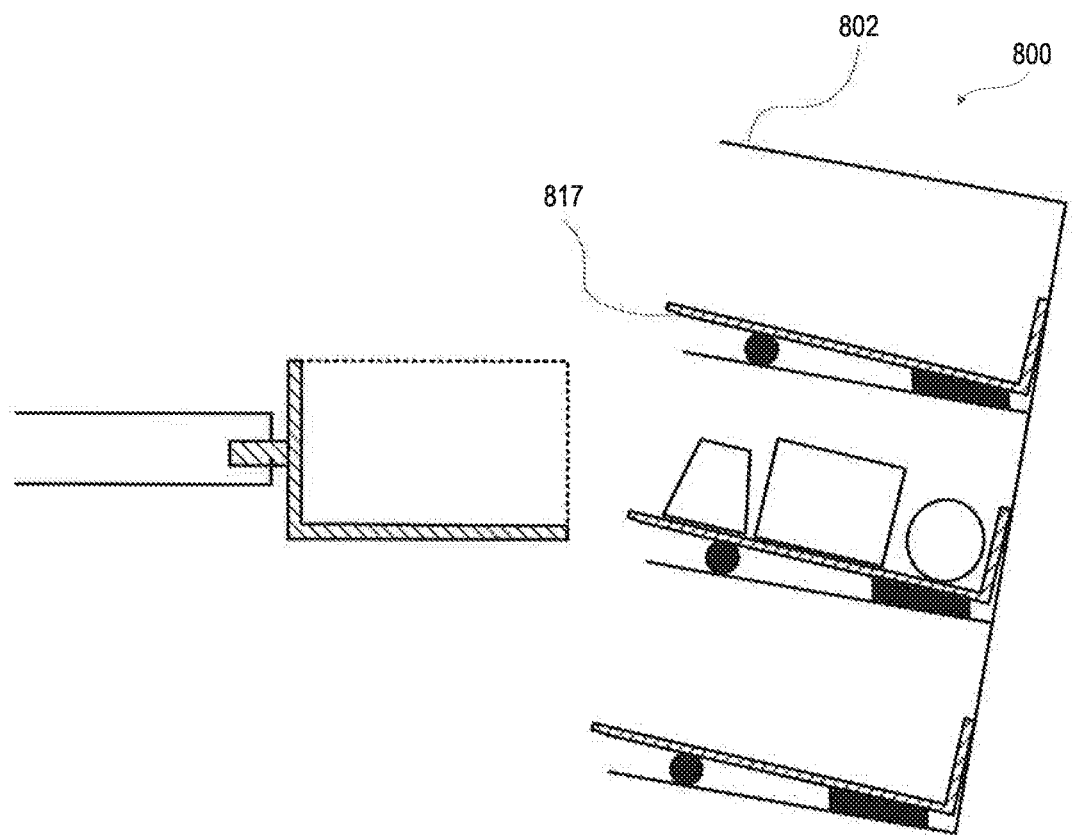
FIG. 8 illustrates a side view diagram of another example material handling system using a one-sided put wall with second example active dispensing mechanisms in a retracted position, according to one or more embodiments.
Figure 9:
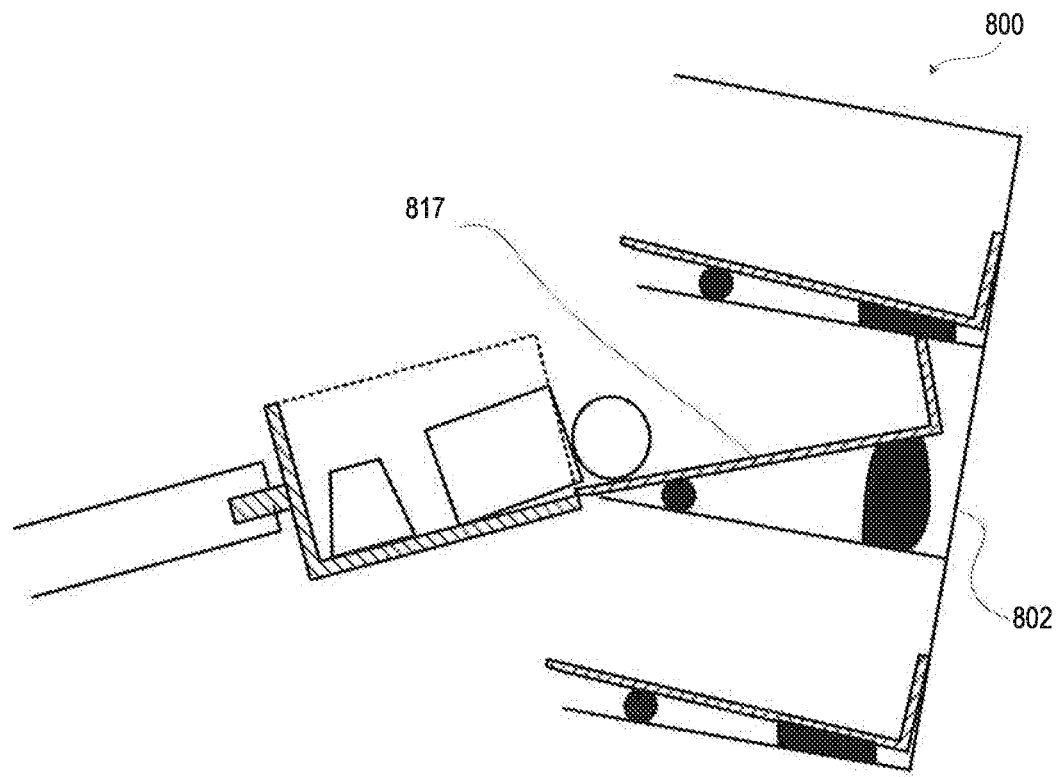
FIG. 9 illustrates a side view diagram of the one-sided put wall of FIG. 8 with one second example active dispensing mechanism in a dispensing position, according to one or more embodiments.

FIG. 6 illustrates another example material handling system 600 that uses a one-sided put wall 602 of with first example active dispensing mechanisms 615 in a retracted position, according to one or more embodiments. FIG. 7 illustrates the one-sided put wall 615 with one first example active dispensing mechanisms 615 in a dispensing position, according to one or more embodiments;

FIG. 8 illustrates another example material handling system 800 using a one-sided put wall 802 with second example active dispensing mechanisms 817 in a retracted position, according to one or more embodiments. FIG. 9 illustrates the one-sided put wall 802 with one second example active dispensing mechanism 817 in a dispensing position, according to one or more embodiments.

Figure 10:
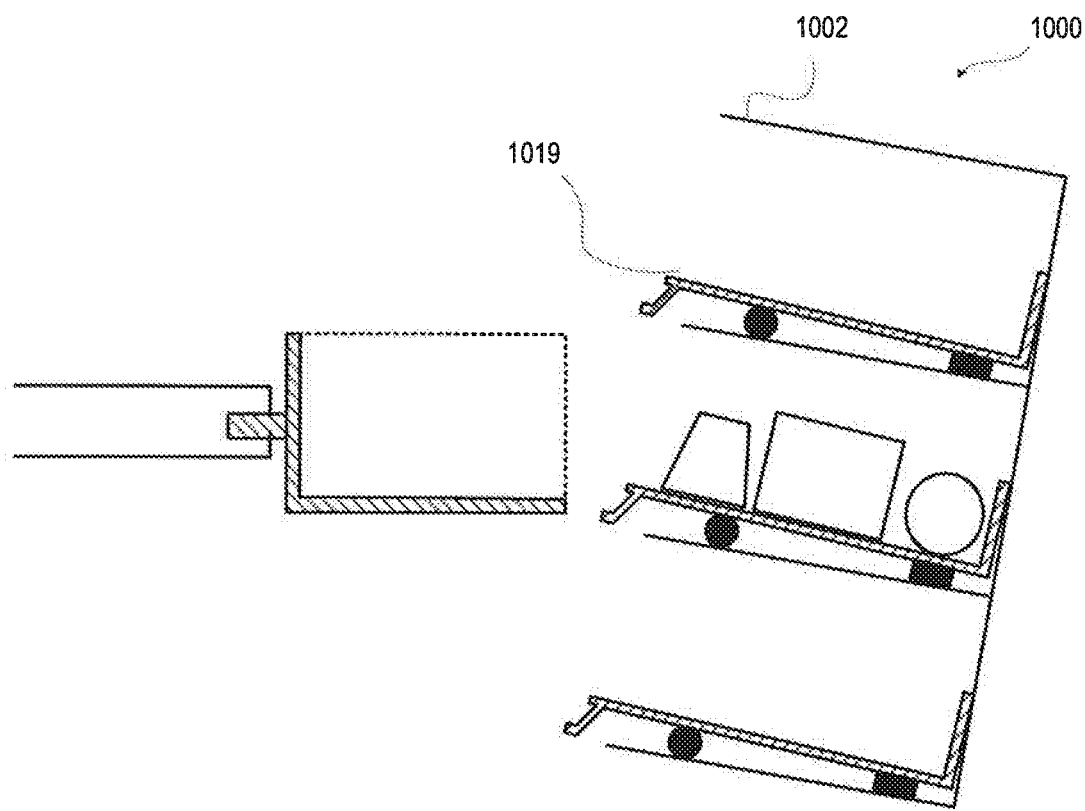
FIG. 10 illustrates a side view diagram of another example material handling system using a one-sided put wall with first example passive dispensing mechanism in a retracted position, according to one or more embodiments.
Figure 11:
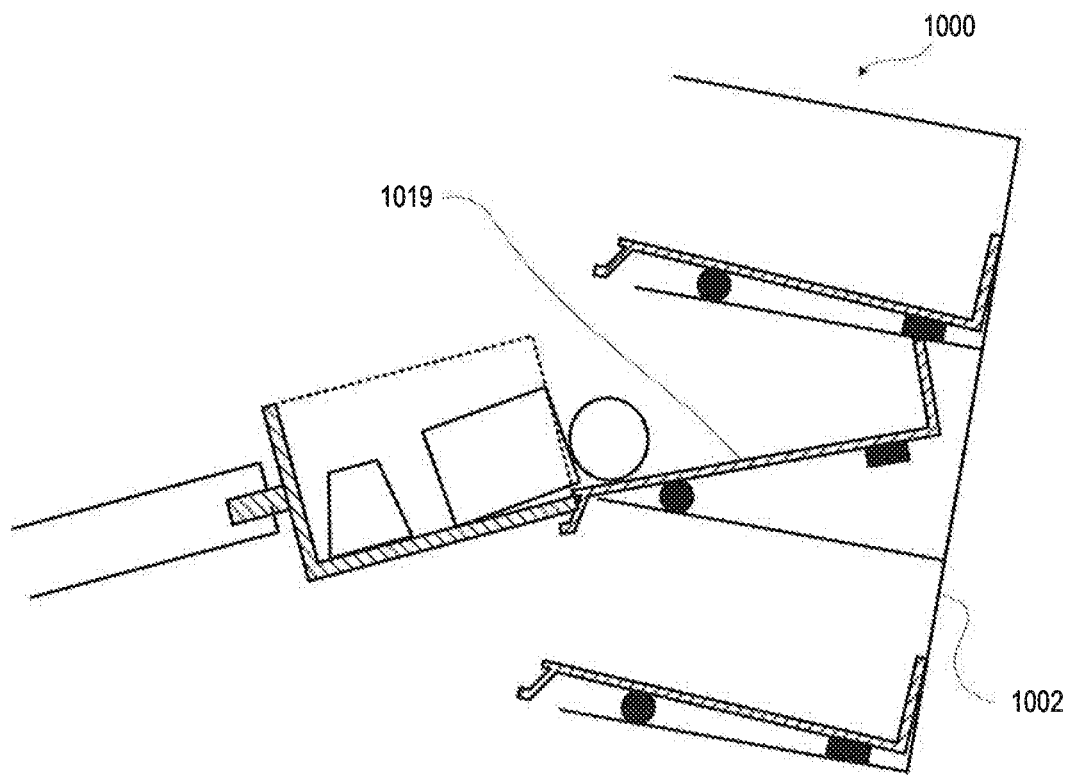
FIG. 11 illustrates a side view diagram of the one-sided put wall of FIG. 10 with one first example passive dispensing mechanisms in a dispensing position, according to one or more embodiments.

FIG. 10 illustrates another example material handling system 1000 using a one-sided put wall 1002 with first example passive dispensing mechanism 1019 in a retracted position, according to one or more embodiments. FIG. 11 illustrates the one-sided put wall 1002 with one first example passive dispensing mechanism 1019 in a dispensing position.

Figure 12:
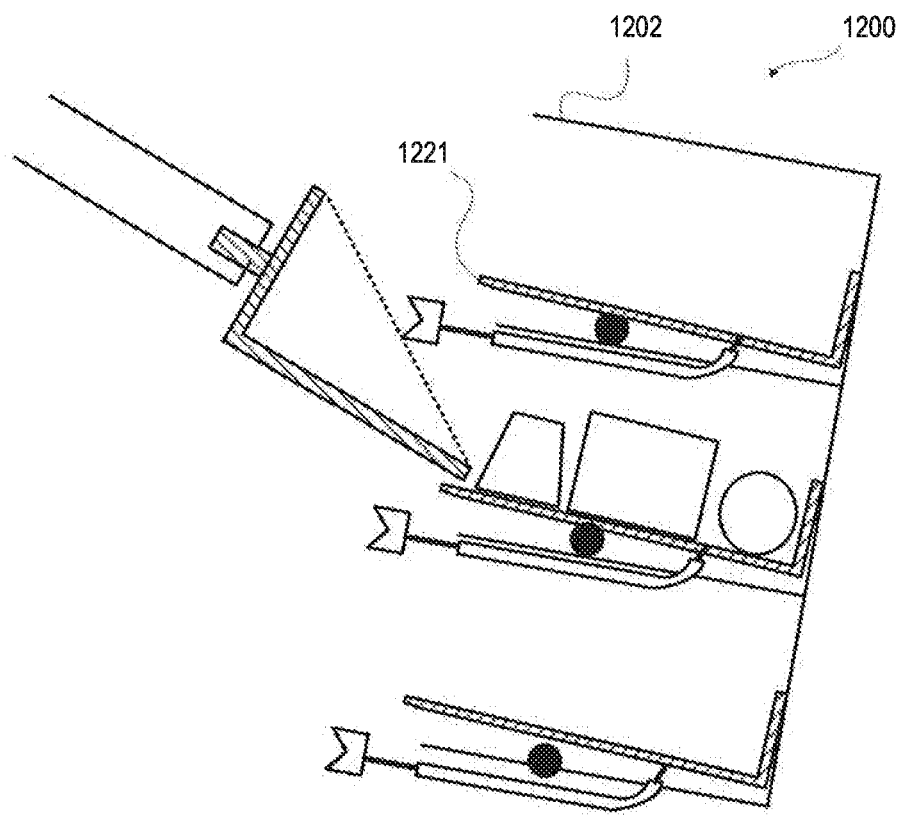
FIG. 12 illustrates a side view diagram of another example material handling system using a one-sided put wall with second example passive dispensing mechanisms in a retracted position, according to one or more embodiments.
Figure 13:
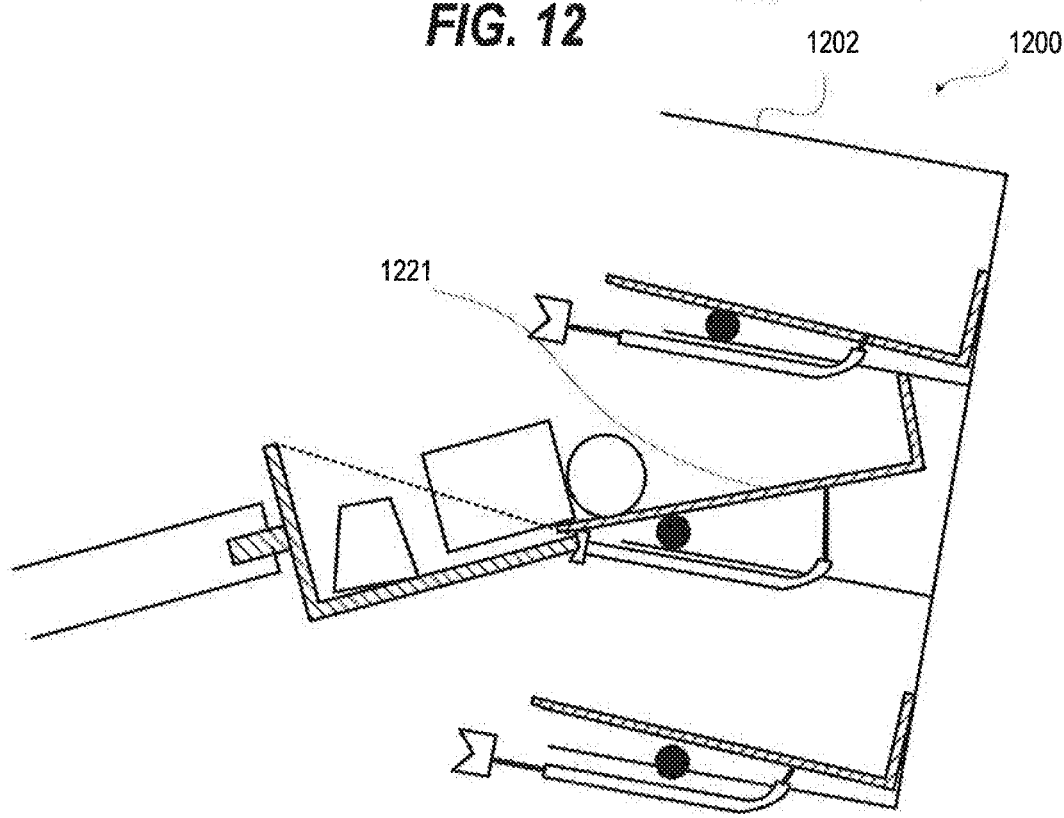
FIG. 13 illustrates a side view diagram of the one-sided put wall of FIG. 12 with one second example passive dispensing mechanism in a dispensing position, according to one or more embodiments.

FIG. 12 illustrates another example material handling system 1200 using a one-sided put wall 1202 with second example passive dispensing mechanism 1221 in a retracted position. FIG. 13 illustrates the one-sided put wall 1202 with one second example passive dispensing mechanism 1221 in a dispensing position.

Figure 14:
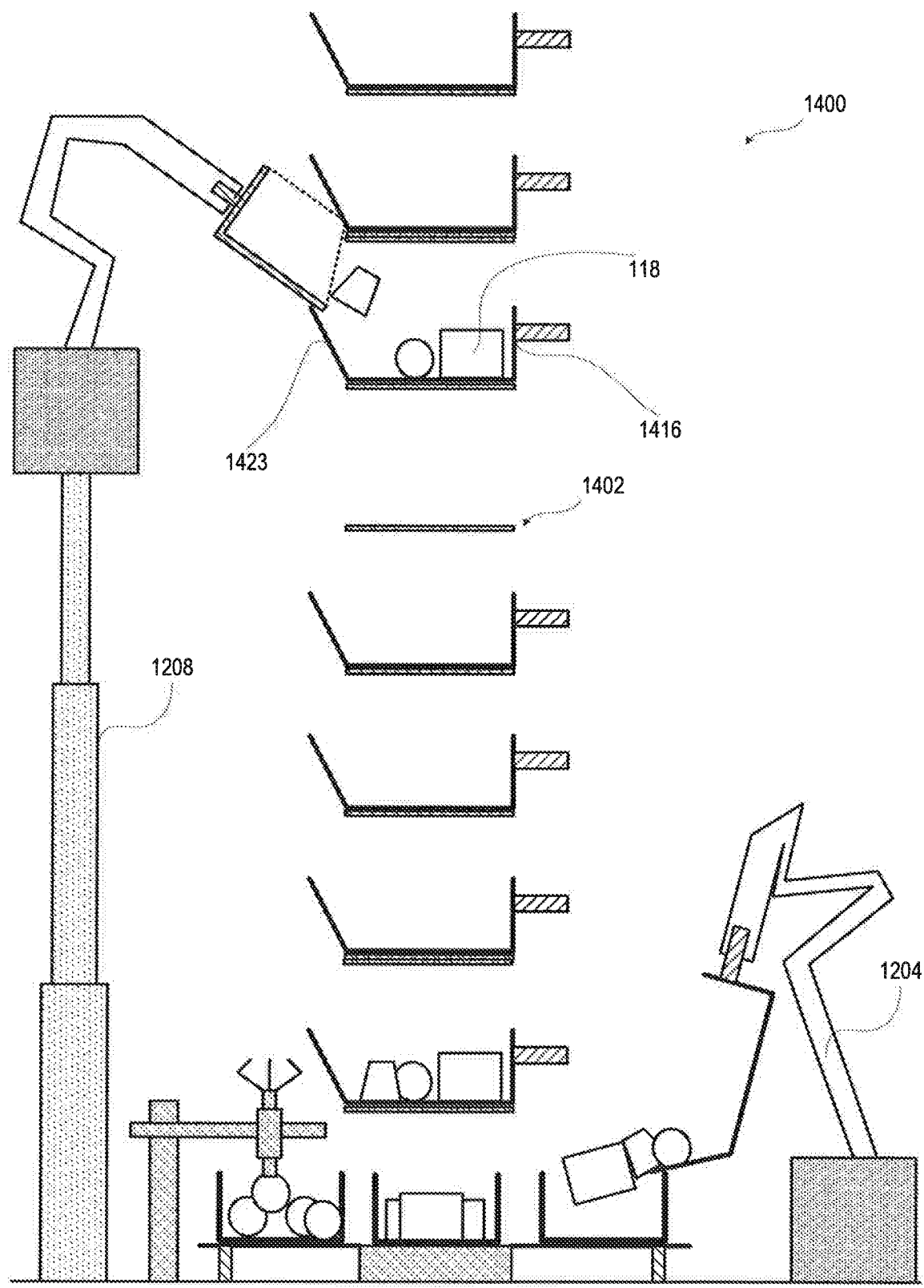
FIG. 14 illustrates a side view diagram of a further example material handling system having a two-sided put wall of expanded vertical height and serviced on both sides by vertically-positionable robotic arms, according to one or more embodiments.
Figure 15:
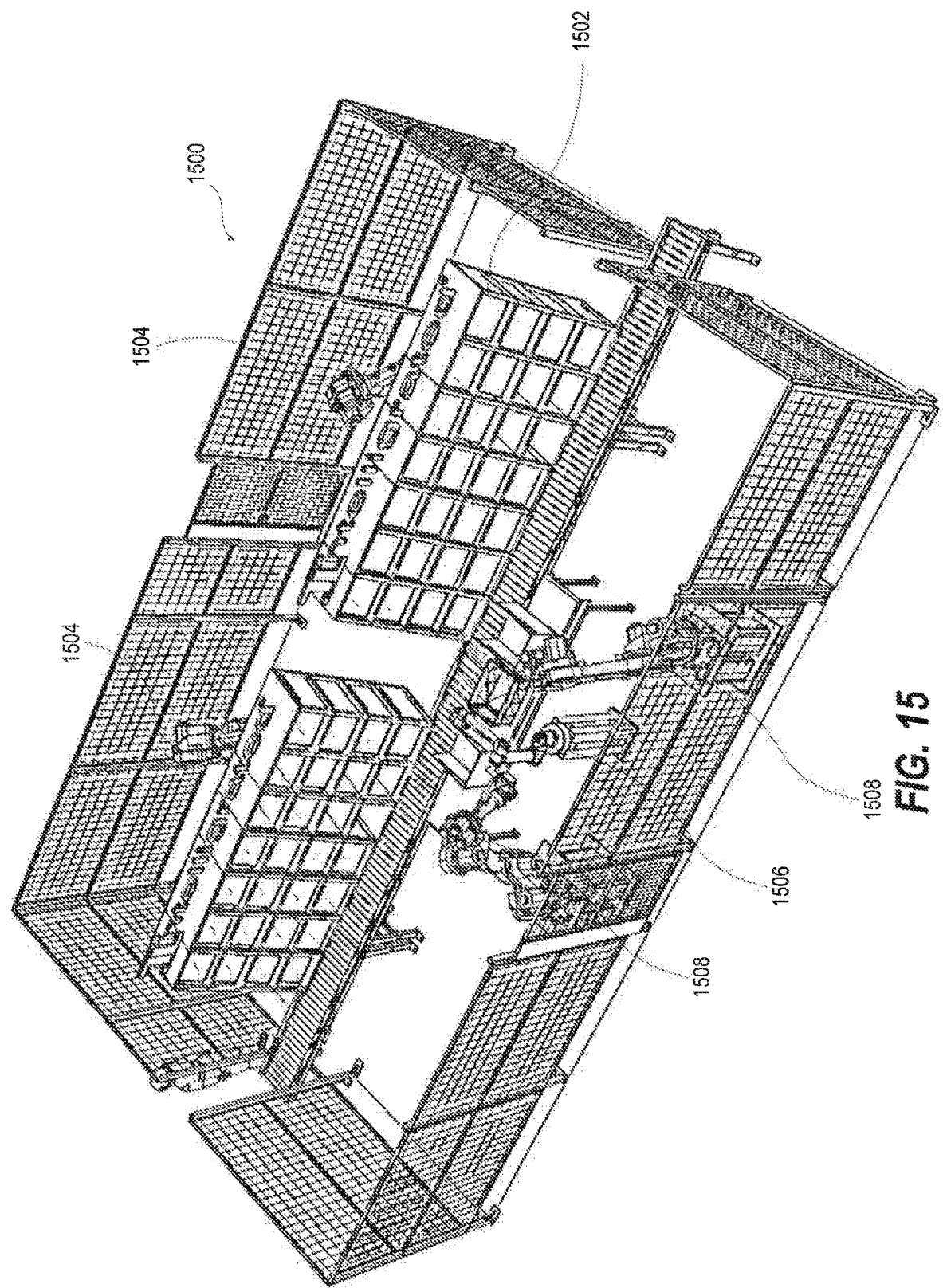
FIG. 15 illustrates a front perspective view of an exemplary material handling system having a two-sided put wall, according to one or more embodiments.
Figure 16:
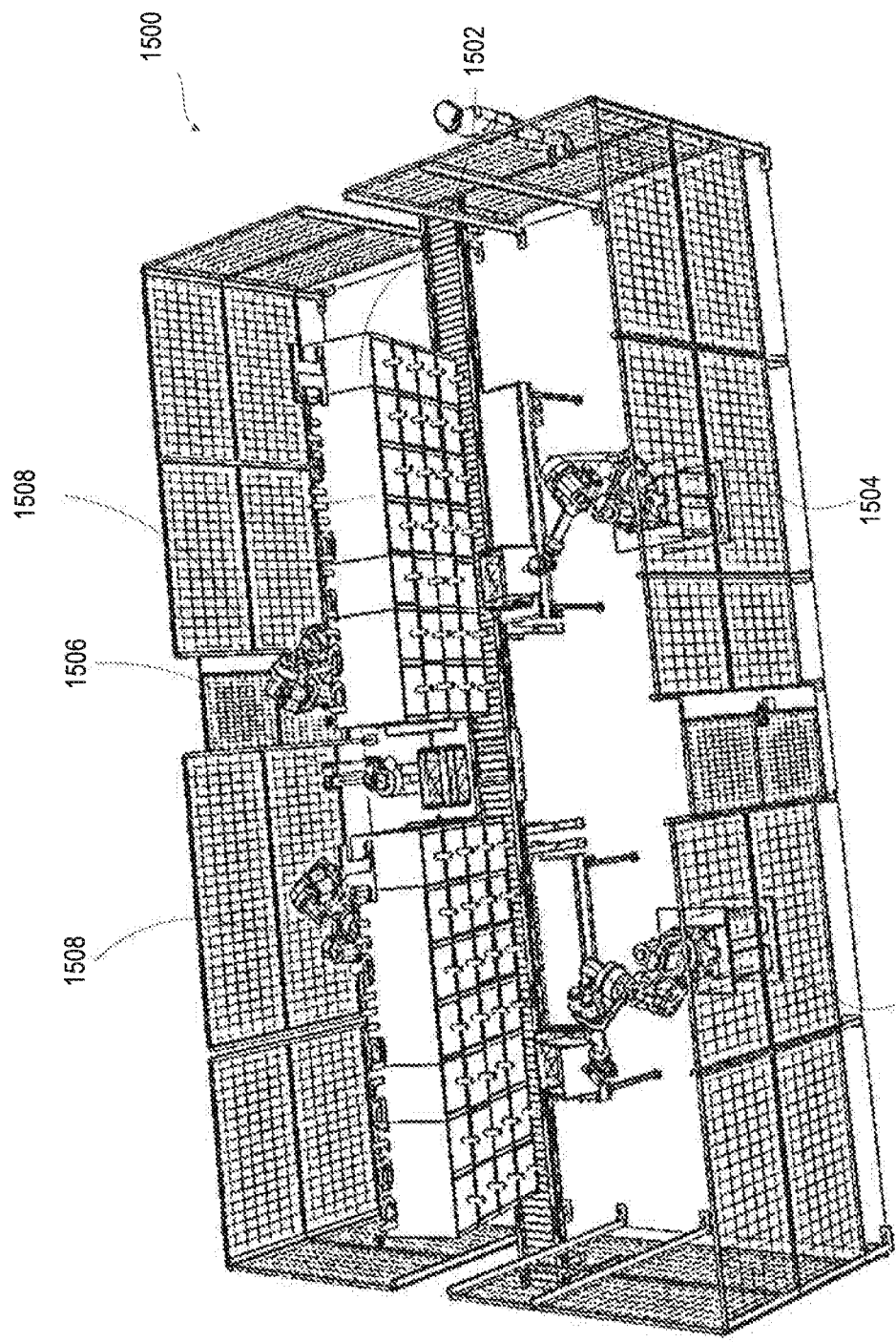
FIG. 16 illustrates a rear perspective view of the exemplary material handling system of FIG. 15, according to one or more embodiments.
Figure 17:
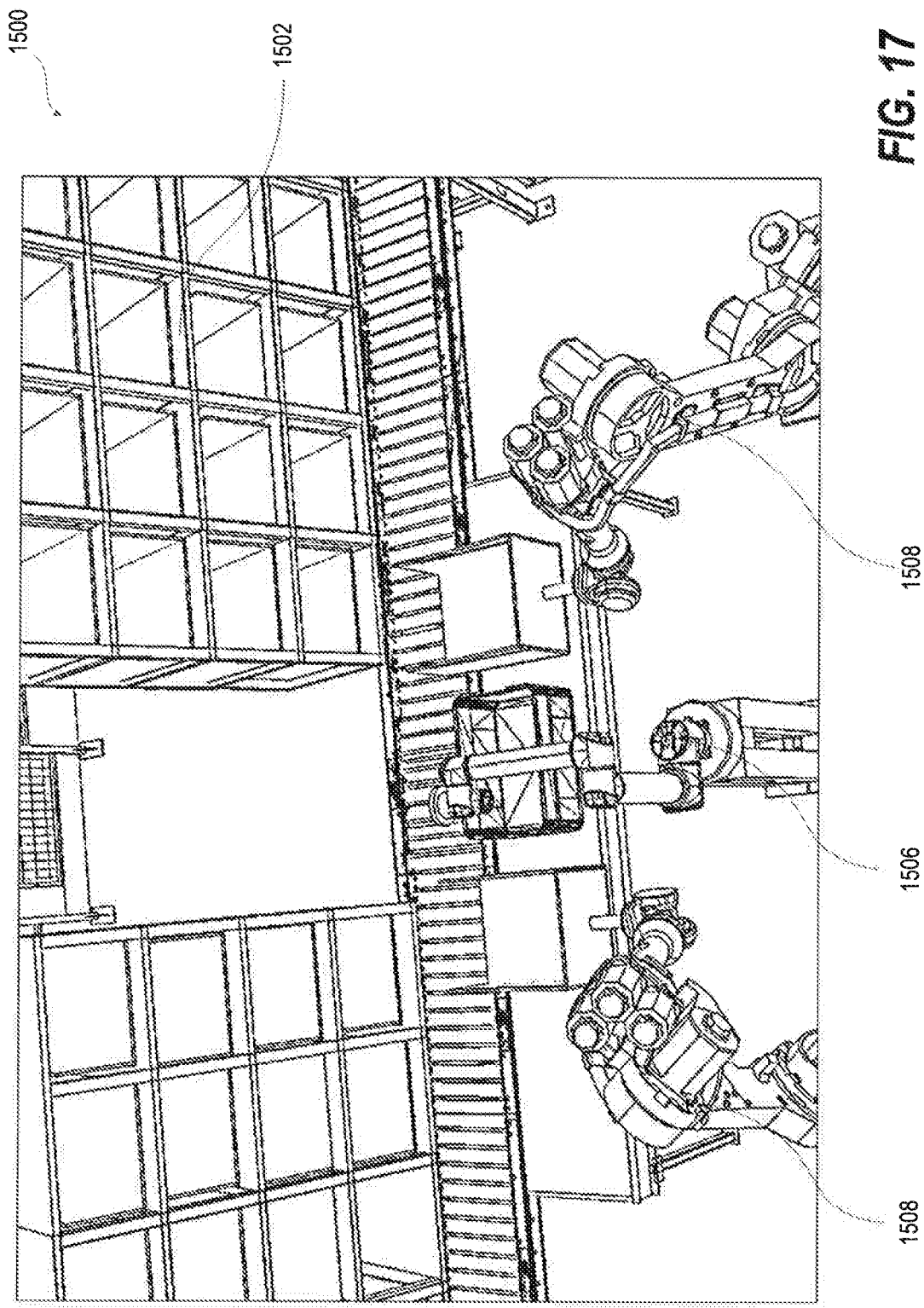
FIG. 17 illustrates a front detailed view of the exemplary material handling system of FIG. 15, according to one or more embodiments.
Figure 18:
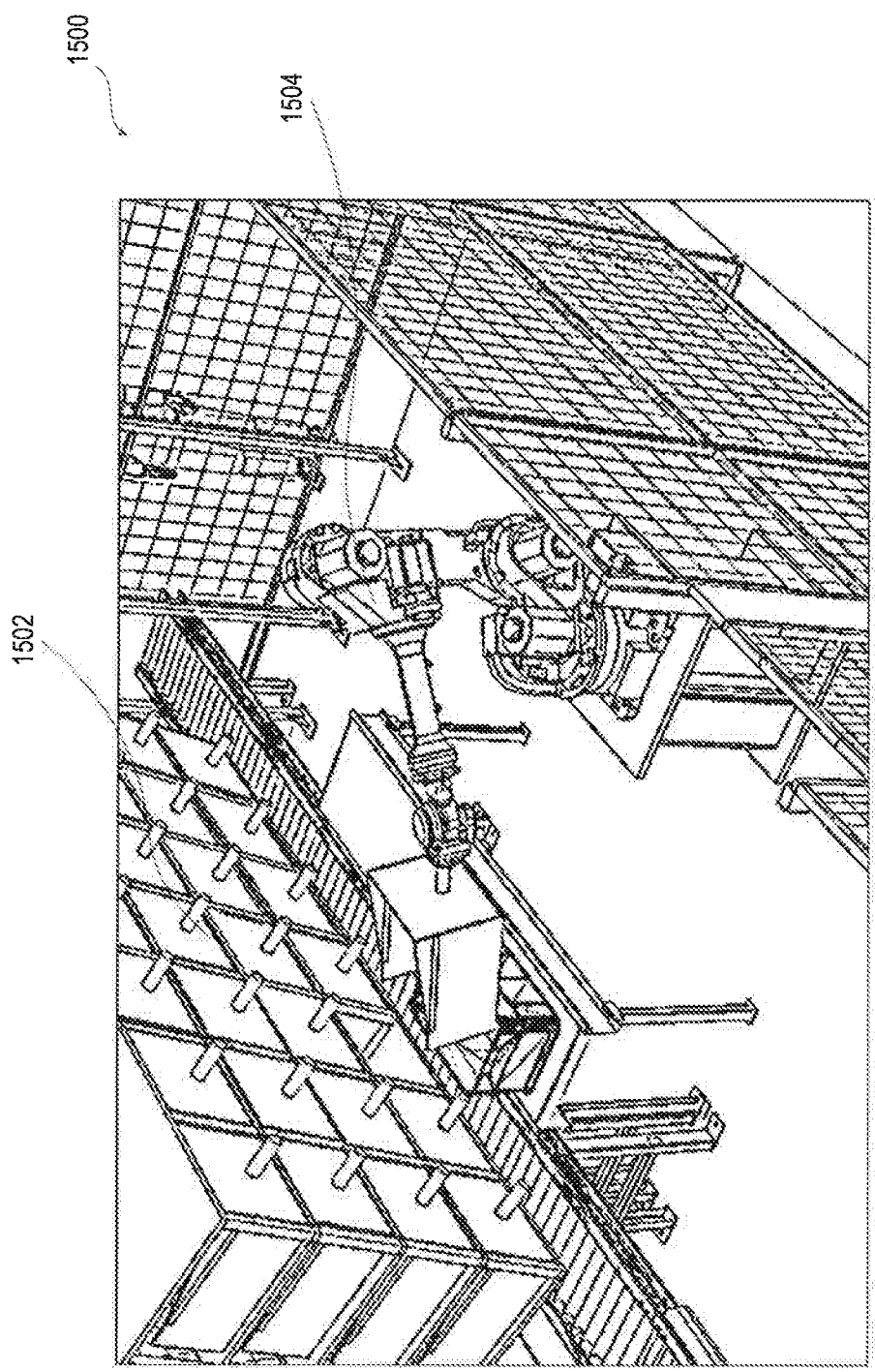
FIG. 18 illustrates a rear detailed view of the exemplary material handling system of FIG. 16, according to one or more embodiments.

FIG. 14 illustrates a further example material handling system 1400 having a two-sided put wall 1402 of expanded vertical height that is serviced on both sides by vertically-positionable robotic arms 1404, 1408, according to one or more embodiments. Removable intermediate holders 1416 have a full height front portion 1423 that is slanted to facilitate depositing and removing articles 118 as well as holding more articles 118 without tipping the put wall 1402.

FIGS. 15-18 illustrate a an exemplary material handling system 1500 having a two-sided put wall 1502 that is tipped back serviced by back side robotic arms 1504, each picking robotic arm 1606, and front side robotic arms 1508.

Figure 19:
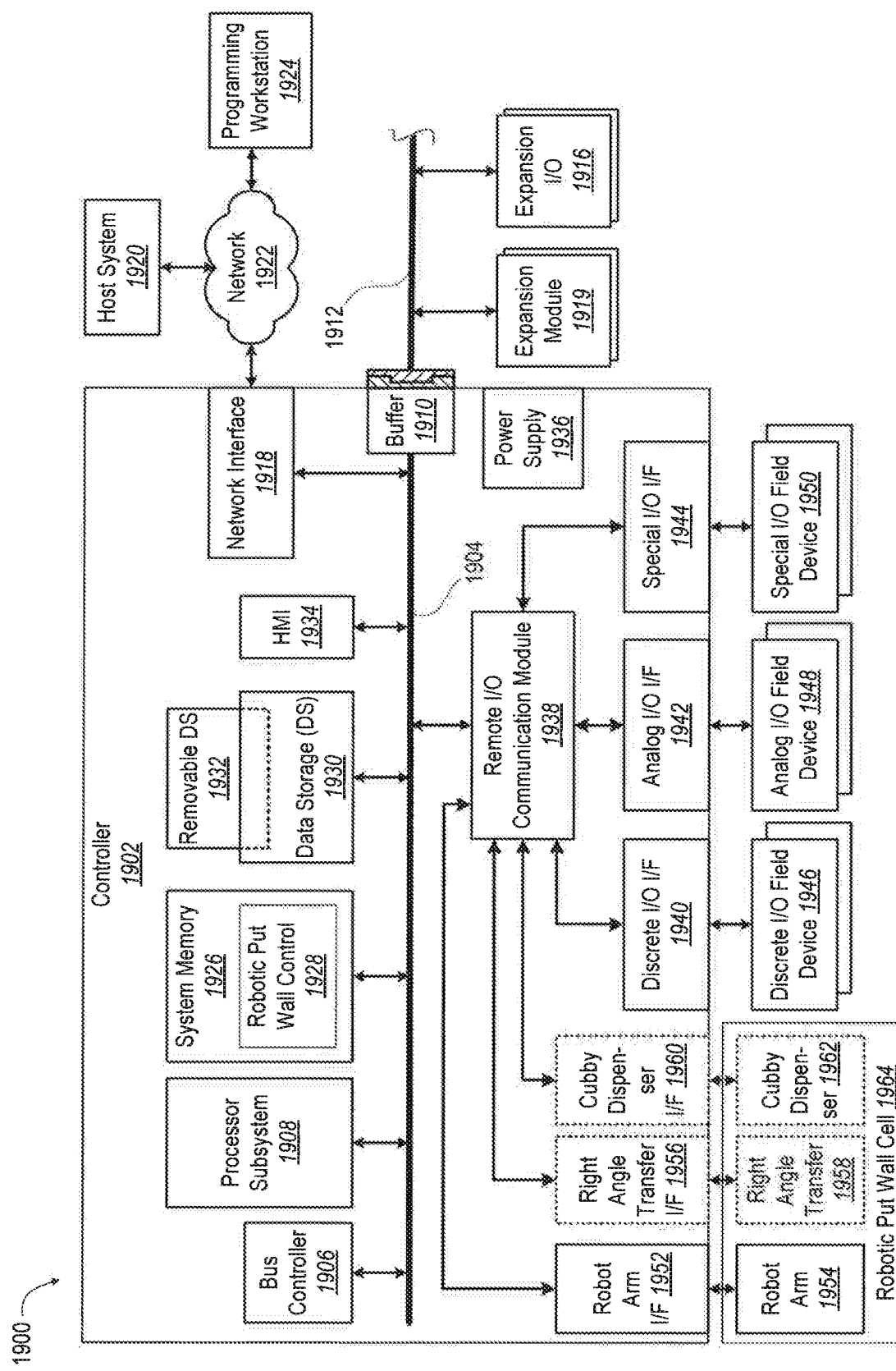
FIG. 19 illustrates a functional block diagram of a communication system including a controller of the material handling system of FIG. 1, according to one or more embodiments.

FIG. 19 illustrates a material handling control system 1900 that provides an exemplary environment within which one or more of the described features of the various embodiments of the disclosure can be implemented. A controller 1902 can be implemented as a unitary device or distributed processing system. The controller 1902 includes functional components that communicate across a system interconnect of one or more conductors or fiber optic fabric that for clarity is depicted as a system bus 1904. System bus 1904 may include a data bus, address bus, and control bus for communicating data, addresses and control information between any of these coupled units. A bus controller 1906 can provide infrastructure management of the system bus 1904. Functional components can include a processor subsystem 1908 consisting of one or more central processing units (CPUs) 1910, digital signal processor/s (DSPs) 1912 and processor memory 1914. Processor subsystem 1908 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes including control of automation equipment of a material handling system. The controller 1902 may be scalable, such as having a buffer 1910 on the system bus 1904 that communicatively couples with an expansion bus 1912 for communicating and interfacing to expansion modules 1915 and expansion input/output (I/O) 1916.

In accordance with various aspects of the disclosure, an element, or any portion of an element, or any combination of elements may be implemented with processor subsystem 1908 that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result.

Controller 1902 may include a network interface device (NID) 1918 that enables controller 1902 to communicate or interface with other devices, services, and components that are located external to controller 1902, such as a host system

1920. Host system 1920 can provide scheduling information to the controller 1902 such as identification of items being directed to a controlled component and their assigned destination. Host system 1920 can provide programming for the controller 1902 and obtain diagnostic and status monitoring data. These networked devices, services, and components can interface with controller 1902 via an external network, such as example network 1922, using one or more communication protocols. Network 1922 can be a local area network, wide area network, personal area network, and the like, and the connection to and/or between network and controller 1902 can be wired or wireless or a combination thereof. For purposes of discussion, network 1922 is indicated as a single collective component for simplicity. However, it is appreciated that network 1922 can comprise one or more direct connections to other devices as well as a more complex set of interconnections as can exist within a wide area network, such as the Internet or on a private intranet. For example, a programming workstation 1924 can remotely modify programming or parameter settings of controller 1902 over the network 1922. Various links in the network 1922 can wired or wireless.

System memory 1926 can be used by processor subsystem 1908 for holding functional components such as data and software such as a robotic put wall control application 1928 that is retrieved from data storage 1930. Data and software can be provided to the controller 1902 or exported from the controller 1902 via removable data storage (RDS) 1932. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, function block diagram (FBD), ladder diagram (LD), structured text (ST), instruction list (IL), and sequential function chart (SFC) or otherwise. The software may reside on a computer-readable medium.

For clarity, system memory 1926 is random access memory, which may or may not be volatile, and data storage 1930 is generally nonvolatile. System memory 1926 and data storage 1930 contain one or more types of computer-readable medium, which can be a non-transitory or transitory. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Certain manual interactions and indications can also be provided via a human-machine interface (HMI) 1934 that is integral or connected to the controller 1902. HMI can be formed of one or more devices that provides input and output functions such as via a touch screen graphical display, keypad, microphone, speaker, haptic device, camera, gauges, light indicators, dials, switches, etc. A power supply 1936 provides regulated voltages at required levels for the various components of the controller 1902 and can draw upon facility power.

A remote I/O communication module 1938 can provide communication protocol for handling of various inputs and outputs between the system bus 1904 and controller interfaces such as a discrete I/O interface/s 1940, analog I/O interface/s 1942, and special I/O interface/s 1944. Each interface 1940, 1942, 1944 can provide as necessary analog-to-digital or digital-to-analog conversion, signal processing, buffering, encoding, decoding, etc., in order to communicate with discrete, analog, or special I/O field devices 1946, 1948, 1950, respectively. In one or more embodiments, the remote I/O communication module 1938 communicates via robotic interface/s 1952 to robotic arms 1954. In one or more embodiments, the remote I/O communication module 1938 communicates via right angle transfer interface/s 1956 to right angle transfer/s 1958. In one or more embodiments, the remote I/O communication module 1938 communicates via cubby dispenser interface/s 1960 to cubby dispenser/s 1962. The robotic arm/s 1954 can be in one or more robotic put wall cells 1964.

Figure 20:
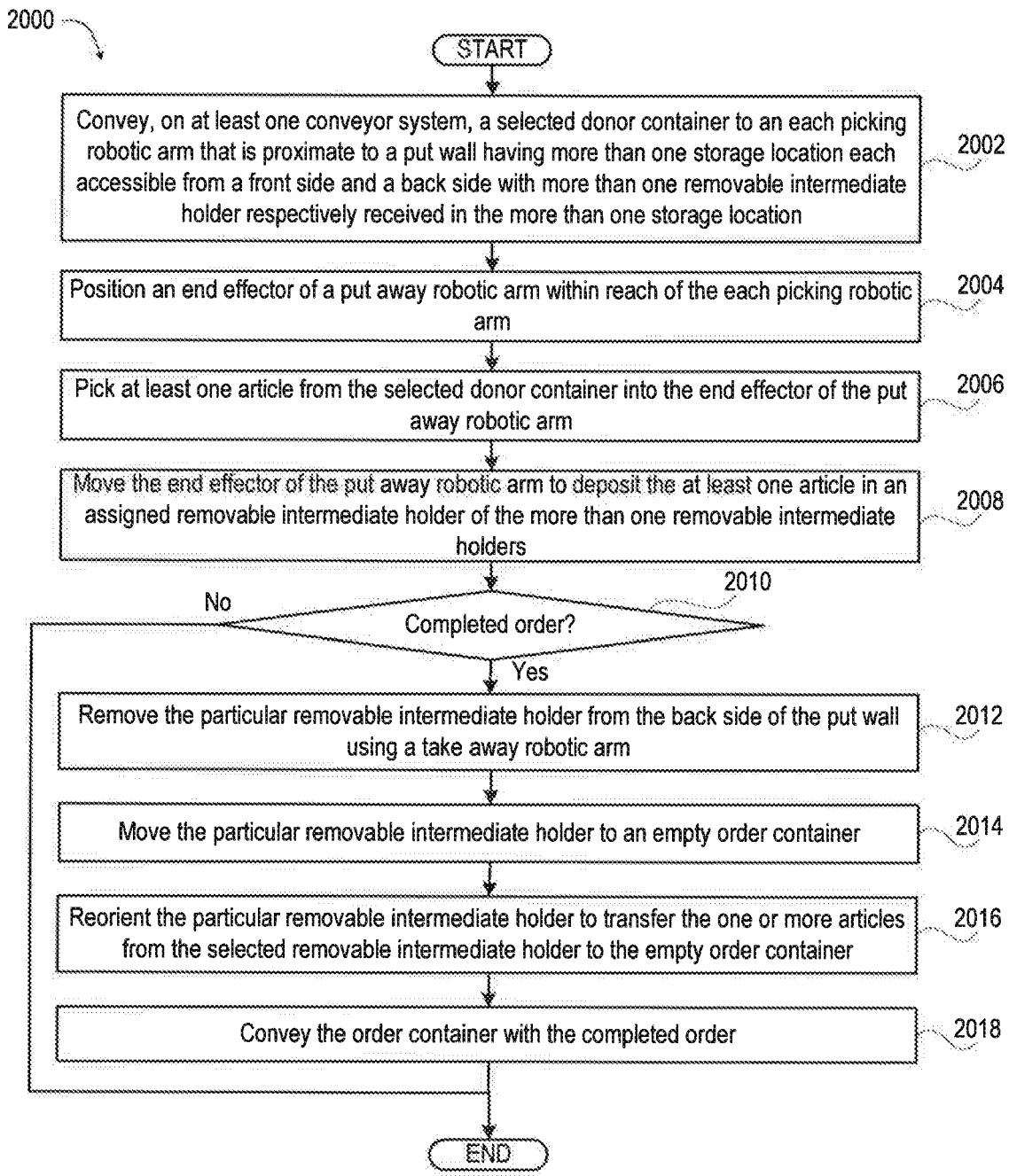
FIG. 20 illustrates a flow diagram of a method of automatically assembling an order of different types of articles utilizing a two-sided put wall in a material handling system, according to one or more embodiments.

FIG. 20 illustrates a method 2000 of assembling an order of different types of articles utilizing a two-sided put wall in a material handling system. In one or more embodiments, the method 2000 includes conveying, on at least one conveyor system, a selected donor container to an each picking robotic arm that is proximate to a put wall having more than one storage location each accessible from a front side and a back side with more than one removable intermediate holder respectively received in the more than one storage location (block 2002). The method 2000 includes positioning an end effector of a put away robotic arm within reach of the each picking robotic arm (block 2004). The method 2000 includes picking at least one article from the selected donor container into the end effector of the put away robotic arm (block 2006). The method 2000 includes moving the end effector of the put away robotic arm to deposit the at least one article in an assigned removable intermediate holder of the more than one removable intermediate holders (block 2008). The method 2000 includes determining whether any particular removable intermediate holder contains one or more articles that constitute a completed order (decision block 2010). In response to determining that a particular removable intermediate holder contains a complete order in decision block 2010, the method 2000 includes removing the particular removable intermediate holder from the back side of the put wall using a take away robotic arm (block 2012). The method 2000 includes moving the particular removable intermediate holder to an empty order container (block 2014). The method 2000 includes reorienting the particular removable intermediate holder to transfer the one or more articles from the selected removable intermediate holder to the empty order container (block 2016). The method 2000 includes conveying the order container with the completed order (block 2018).

Figure 21:
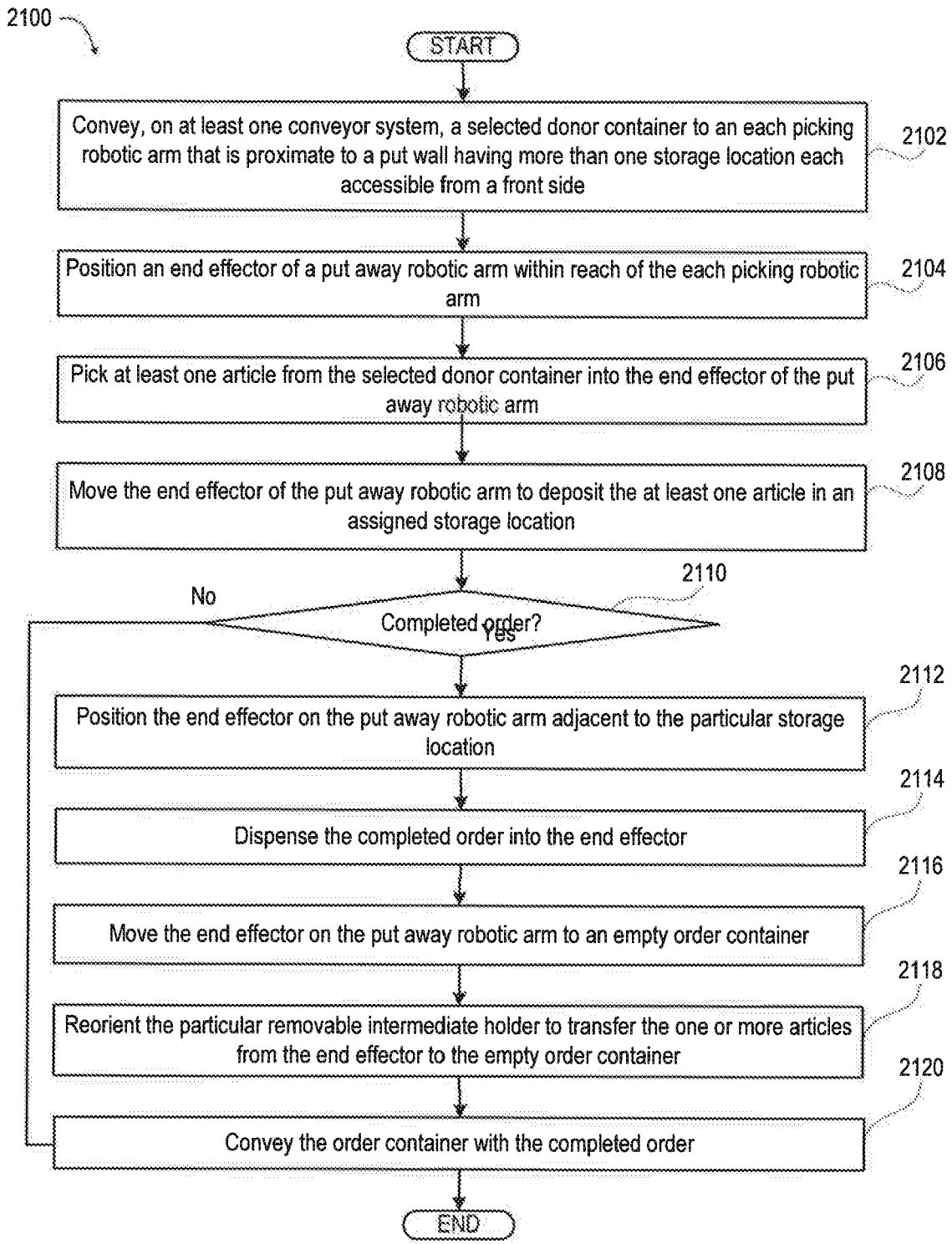
FIG. 21 illustrates a flow diagram of a method of automatically assembling an order of different types of articles utilizing a one-sided put wall in a material handling system, according to one or more embodiments

FIG. 21 illustrates a method 2100 of assembling an order of different types of articles utilizing a one-sided put wall in a material handling system. In one or more embodiments, the method 2100 includes conveying, on at least one conveyor system, a selected donor container to an each picking robotic arm that is proximate to a put wall having more than one storage location each accessible from a front side (block 2102). The method includes positioning an end effector of a put away robotic arm within reach of the each picking robotic arm (block 2104). The method includes picking at least one article from the selected donor container into the end effector of the put away robotic arm (block 2106). The method includes moving the end effector of the put away robotic arm to deposit the at least one article in an assigned storage location (block 2108). The method includes determining whether any particular storage location contains one or more articles that constitute a completed order (decision block 2110). In response to determining that a particular storage location contains a completed order in decision block 2110, the method includes positioning the end effector on the put away robotic arm adjacent to the particular storage location (block 2112). The method includes dispensing the completed order into the end effector (block 2114). In one or more embodiments, the method 2100 includes dispensing the completed order into the end effector by actuating an active dispensing mechanism at the particular storage location. In one or more embodiments, the method 2100 includes dispensing the completed order into the end effector by pushing the end effector into a passive actuator that causes any articles in the particular location to be one of: (i) pushed out and (ii) slid out of the particular location. The method includes moving the end effector on the put away robotic arm to an empty order container (block 2116). The method includes reorienting the particular removable intermediate holder to transfer the one or more articles from the end effector to the empty order container (block 2118). The method includes conveying the order container with the completed order (block 2120).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A material handling system configured to automatically pick an order, the material handling system comprising:
    a put wall having a storage location that is accessible from a front side and a back side;
    a holder that is removably received in the storage location;
    a first robotic arm positioned on the back side of the put wall, the first robotic arm comprising an end effector configured to engage the holder from the front side or the back side of the storage location;
    a controller in communication with a source of inventory data of the put wall and in communication with the first robotic arm, wherein the controller is configured to:
        determine whether the holder contains one or more articles that are ready for transporting away from the put wall; and
        in response to determining that the holder is ready for transporting, direct the first robotic arm to: (i) engage the holder, (ii) move the holder to an empty order container, and (iii) transfer the one or more articles from the holder to the empty order container.

2. The material handling system of claim 1, wherein the holder further comprises an engagement feature configured to engage the end effector of the first robotic arm.

3. The material handling system of claim 2, wherein the engagement feature comprises a cylindrical, horizontal handle.

4. The material handling system of claim 2, wherein the holder further comprises an open top and front with the engagement feature on the back.

5. The material handling system of claim 2, wherein the first robotic arm is configured to reorient the holder to transfer the one or more articles from the holder to the empty order container.

6. The material handling system of claim 1, further comprising a second robotic arm positioned on the front side of the put wall, the second robotic arm having a reach that services at least one area proximate to a donor tote received from a conveyor system, and comprising at least one end effector configured to pick one or more articles from the received donor tote, wherein the controller is configured to:
    (i) receive an assignment of at least one article from the received donor tote for the holder, and (ii) direct the second robotic arm to pick and place the at least one article from the received donor tote in a location destined for the holder.

7. The material handling system of claim 6, wherein:
    the put wall is tipped toward the rear side; and
    the holder further comprises a partially cutaway forward end configured to enable insertion of articles from the front side of the put wall and to enable emptying with a reduced degree of reorienting.

8. The material handling system of claim 6, further comprising a transfer conveyor configured to move the donor tote from the conveyor system to the second robotic arm.

9. The material handling system of claim 6, wherein the controller is configured to direct at least one of: (i) the first robotic arm to push an order tote, or (ii) the second robotic arm to push an emptied donor tote onto the conveyor system for transport away from the put wall.

10. The material handling system of claim 6, further comprising a third robotic arm positioned on the front side of the put wall within reach of the at least one area serviced by the second robotic arm and within reach of at least a portion of the put wall, the third robotic arm comprising an end effector configured to receive and cradle the at least one article from the second robotic arm, wherein the controller, in response to receiving an indication that the at least one article is in the end effector of the third robotic arm, is configured to direct the third robotic arm to deposit the at least one article in the holder.

11. The material handling system of claim 10, wherein at least one of the first or third robotic arms are attached to a vertical lift configured to service a full height of the put wall.

12. The material handling system of claim 10, wherein at least one of the first or third robotic arms comprise a movable base configured to service a horizontal extent of the put wall that is greater than the reach of the at least one of the first or third robotic arms.

13. The material handling system of claim 1, further comprising an empty container storage device, wherein the controller is configured to:
  (i) direct a conveyor system to transfer a donor tote that is emptied of articles to the empty container storage device for storage as an order tote; and
  (ii) direct the empty container storage device to dispense the order tote to the first robotic arm.

14. A method for automatically picking orders, the method comprising:
  receiving an article by a first robotic arm positioned on a front side of a put wall having storage locations each accessible from a front side and a back side, the first robotic arm comprising an end effector shaped to receive and cradle articles;
  determining, by a controller, whether a storage location contains articles ready for transporting away from the put wall; and
  in response to determining that the storage location contains articles ready for transporting, directing, by the controller, the first robotic arm to: (i) position the end effector proximate and below the storage location to receive the articles from the storage location; (ii) move the end effector to an empty order container; and (iii) transfer the articles from the end effector to the empty order container.

15. The method of claim 14, further comprising, conveying, on at least one conveyor system, the empty order container to each robotic arm that is proximate to the put wall.

16. The method of claim 14, further comprising, reorienting the end effector, by the first robotic arm, to transfer the one or more articles from the end effector to the empty order container.

17. The method of claim 14, further comprising dispensing the articles from the storage location of the put wall into the end effector.

18. The method of claim 17, wherein dispensing the articles into the end effector comprises actuating an active dispensing mechanism at the storage location.

19. The method of claim 17, wherein dispensing the articles into the end effector comprises pushing the end effector into a passive actuator that causes any articles in the storage location to be: (i) pushed out or (ii) slid out of the storage location.

* * * * *